United States Patent
Gupta et al.

(10) Patent No.: US 8,932,497 B2
(45) Date of Patent: Jan. 13, 2015

(54) FIRE RETARDANT COATINGS AND BODIES, AND METHODS OF USE

(76) Inventors: Laxmi C. Gupta, Los Alamitos, CA (US); Ashish Dhuldhoya, Chino Hills, CA (US)

( * ) Notice: Subject to any disclaimer, the term of this patent is extended or adjusted under 35 U.S.C. 154(b) by 831 days.

(21) Appl. No.: 12/403,959

(22) Filed: Mar. 13, 2009

(65) Prior Publication Data
US 2009/0309077 A1    Dec. 17, 2009

Related U.S. Application Data

(60) Provisional application No. 61/124,347, filed on Apr. 16, 2008, provisional application No. 61/196,727, filed on Mar. 13, 2008.

(51) Int. Cl.
C09K 21/00 (2006.01)
C09K 21/14 (2006.01)
C09D 5/18 (2006.01)

(52) U.S. Cl.
CPC ............... *C09K 21/14* (2013.01); *C09D 5/185* (2013.01)
USPC ........... 252/606; 252/601; 252/602; 252/604; 523/179

(58) Field of Classification Search
USPC .................. 524/115, 154, 464, 469; 523/179; 252/601, 606, 602, 604; 264/235, 250, 264/45.3
See application file for complete search history.

(56) References Cited

U.S. PATENT DOCUMENTS

| | | | |
|---|---|---|---|
| 3,574,644 A * | 4/1971 | Olstowski et al. ............. | 523/200 |
| 3,642,944 A * | 2/1972 | Abbott, Jr. .................... | 524/100 |
| 3,748,154 A * | 7/1973 | Seipel et al. ................ | 106/18.21 |
| 3,969,231 A * | 7/1976 | Hay ................................ | 428/96 |
| 4,147,678 A * | 4/1979 | Mao et al. ...................... | 524/100 |
| 4,426,488 A | 1/1984 | Wyman | |
| 4,772,642 A | 9/1988 | Staendeke | |
| 4,879,066 A | 11/1989 | Crompton | |
| 4,895,878 A * | 1/1990 | Jourquin et al. .............. | 521/103 |
| 5,049,187 A | 9/1991 | Smith | |
| 5,165,904 A | 11/1992 | Staffel et al. | |
| 5,183,877 A | 2/1993 | Swanson | |
| 5,213,783 A | 5/1993 | Fukumura et al. | |
| 5,277,887 A | 1/1994 | Staffel et al. | |
| 5,288,797 A | 2/1994 | Khalil et al. | |
| 5,430,080 A | 7/1995 | Iwata et al. | |
| 5,459,185 A | 10/1995 | Nakata et al. | |
| 5,464,921 A | 11/1995 | Laas et al. | |
| 5,530,085 A | 6/1996 | Giorgini | |
| 5,534,291 A | 7/1996 | Fukumura et al. | |
| 5,536,805 A | 7/1996 | Kangas | |
| 5,556,894 A | 9/1996 | Fishback et al. | |
| 5,587,448 A | 12/1996 | Engen | |
| 5,596,063 A | 1/1997 | Lutter et al. | |
| 5,599,626 A | 2/1997 | Fukumura et al. | |
| 5,603,798 A | 2/1997 | Bhat | |
| 5,672,652 A | 9/1997 | Bhat | |
| 5,798,409 A | 8/1998 | Ho | |
| 5,852,103 A | 12/1998 | Bhat | |
| 5,894,029 A | 4/1999 | Brown et al. | |
| 5,962,618 A | 10/1999 | Primeaux, II et al. | |
| 6,262,217 B1 | 7/2001 | Tallmadge et al. | |
| 6,291,068 B1 | 9/2001 | Wang et al. | |
| 6,403,143 B1 | 6/2002 | Bevans et al. | |
| 6,552,100 B2 | 4/2003 | McLaren et al. | |
| 6,706,774 B2 | 3/2004 | Munzenberger et al. | |
| 6,723,358 B1 | 4/2004 | Van Lengerich | |
| 2001/0002272 A1 | 5/2001 | Brunner | |
| 2003/0047836 A1* | 3/2003 | Rickner et al. ................ | 264/235 |
| 2004/0005413 A1 | 1/2004 | Li et al. | |
| 2005/0143503 A1 | 6/2005 | Bauer et al. | |
| 2006/0128870 A1 | 6/2006 | Marx | |
| 2006/0160978 A1 | 7/2006 | Gupta et al. | |
| 2009/0292032 A1 | 11/2009 | Gupta et al. | |

FOREIGN PATENT DOCUMENTS

| | | | |
|---|---|---|---|
| DE | 19945831 | | 3/2001 |
| GB | 1049399 | * | 11/1966 |
| JP | 3-131508 | | 6/1991 |
| PL | 148671 | * | 11/1989 |
| WO | WO 92/08758 | | 5/1992 |

OTHER PUBLICATIONS

Encyclopedia of Chemical Technology 4th ed. vol. 14 1995 John Wiley & Sons New York p. 923.*
Webster's (Webster's New World Thesaurus, ed. Laird (C) 1990 Cleveland OH, Pocket Books).*
Kirk-Othmer "Encyclopedia of Chemical Technology," Second Edition, vol. 12, pp. 46-47 (1967).
D. Calle, et al., "Reaction of a diepoxide with diisocyanate in bulk," Polymer Bulletin 24, 23-30, (1990).
John McMurry "Ring-Opening Reactions of Epoxides," Organic Chemistry, Fourth Edition, Chapter 18, pp. 686-687, (1996).
Ceepree®, Ceepree® Plus, Unique Range of Fire Barrier Additives, Issue No. 2, 14 pages.
Gula, George et al., "Dedicated Equipment for the Use of Expandable Graphite," *Polyurethanes 2004*, pp. 409-420, Oct. 18-20, 2004.
European Flame Retardants Association, Flame Retardants Fact Sheet (Ammonium polyphosphate), 4 pages.

(Continued)

*Primary Examiner* — Patrick Ryan
*Assistant Examiner* — Aaron Greso
(74) *Attorney, Agent, or Firm* — Kagan Binder, PLLC

(57) ABSTRACT

Fire retardant coating systems and solid body cast systems comprise a first part comprising at least one ingredient having NCO functionality; and a second part comprising at least one ingredient having an active hydrogen functionality that is co-reactive with the NCO, wherein the first part and the second part are formulated so that when the parts are mixed together they form a cured coating or a solid body. The coating system or solid body cast system comprises a first fire retardant ingredient that is a phosphorus-based compound, a second fire retardant ingredient that is an intumescent material, and a third fire retardant ingredient that is a brominated ingredient. Methods for preparing a fire retardant coating or solid body are also described.

30 Claims, No Drawings

(56) References Cited

OTHER PUBLICATIONS

Nyacol® Nano Technologies, Inc., NYACOL NYAGRAPH Data Sheet, Expandable Graphite, Flame Retardant Additives, 1 page.

Underwriters Laboratories Inc., "The Significance of the UL Classification Mark on Intumescent Coatings," 2 pages.

http://www.chance-hunt.com/ceepree/news.htm, "Ceepree®, Unique Range of Fire Barrier Additives," 1 page.

http://www.jlschemical.com, "JLS Flame Retardants Overview, JLS Professional Flame Retardants,"Hangzhou JLS Flame Retardants Chemical Co., Ltd., 12 pages.

www.specialchem4polymers.com, "Ammonium Polyphosphate Center—Why Use APP?," 2 pages.

www.specialchem4polymers.com, "Ammonium Polyphosphate Center—Description & Benefits," 2 pages.

www.specialchem4polymers.com, "Ammonium Polyphosphate Center—Mechanism of Action," 2 pages.

www.specialchem4polymers.com, "Flame Retardants Center—Melamine Compounds—Why use melamine based FR?," 2 pages.

www.specialchem4polymers.com, "Flame Retardants Center—Mechanism of Action," 1 page.

www.specialchem4polymers.com, "Flame Retardants Center—Chemical Effect Condensed Phase," 2 pages.

www.specialchem4polymers.com, "Flame Retardants Center—Physical Effect," 1 page.

www.specialchem4polymers.com, "Flame Retardants Center—Phosphorus Based—AmmoPoly," 2 pages.

www.specialchem4polymers.com, "Flame Retardants Center—Phosphorus Based," 2 pages.

www.specialchem4polymers.com, "Flame Retardants Center—Zinc Borate—Why use Zinc Borate?," 2 pages.

www.specialchem4polymers.com, "Flame Retardants Center—Future Trends," 2 pages.

www.specialchem4polymers.com, "Flame Retardants Center—Fire Dynamics," 3 pages.

www.specialchem4polymers.com, "Flame Retardants Center—Building Construction—Euro," 2 pages.

www.specialchem4polymers.com, "Flame Retardants Center—Building Construction—Comparison," 2 pages.

www.specialchem4polymers.com, "Flame Retardants Center—Furniture," 2 pages.

www.specialchem4polymers.com, "Flame Retardants Center—Furniture—UK," 2 pages.

www.specialchem4polymers.com, "Flame Retardants Center—Furniture—USA," 2 pages.

* cited by examiner

FIRE RETARDANT COATINGS AND BODIES, AND METHODS OF USE

This application claims the benefit of U.S. Provisional Application Ser. No. 61/124,347 filed on Apr. 16, 2008, entitled "FIRE RETARDANT COATINGS AND BODIES, AND METHODS OF USE," which application is incorporated herein by reference in its entirety; and claims the benefit of U.S. application Ser. No. 12/075,668 filed on Mar. 13, 2008, entitled "FIRE RETARDANT COATINGS AND BODIES, AND METHODS OF USE," which application is incorporated herein by reference in its entirety. A Request For Conversion of a Non-Provisional patent application to a Provisional Patent Application Under 37 C.F.R. 1.53(c) (2) for U.S. application Ser. No. 12/075,668 was filed on Apr. 16, 2008, and is of record in the U.S. Patent and Trademark Office.

FIELD OF INVENTION

The present invention relates to fire retardant systems and related methods and uses of such fire retardant systems.

BACKGROUND OF THE INVENTION

Fire retardants are well-known and are typically added to and/or applied as a surface treatment to help prevent the spread of fire and/or protect a material exposed to fire. Commercially available fire retardants may be obtained in great variety, including examples such as bromine-based fire retardants, phosphorous-based fire retardants (e.g., ammonium polyphosphate (APP)), nitrogen-based fire retardants (e.g., melamine), inorganic-based fire retardants, and chlorine-based fire retardants.

A fire retardant can also be classified by the mechanism in which it acts as a fire retardant. For example, a class of fire retardants acts by absorbing heat, thereby cooling the surrounding material. Examples of cooling fire retardant materials are aluminum hydroxide and magnesium hydroxide. Another class of fire retardant material operates by release of gas that interferes with the flame. Examples of this class are the halogens, such as bromine and chlorine.

Another class of fire retardants use the mechanism known as "intumescence," and is attributable to the fire retardant category known as "intumescents." Intumescent fire retardants expand and form a char layer as a barrier between the underlying material and surrounding environment. This char layer is hard to burn, and insulates and protects the underlining material from burning. Intumescents operate by expansion either as a result of a chemical reaction under heat, or as by a primarily physical reaction that occurs due to the configuration of components in the intumescent material. Examples of chemical intumescents include phosphate-based materials and silica gel/potassium carbonate mixtures. Examples of physical intumescents include expandable graphite.

Flame retardants can be used with a wide variety of items such as furniture, floors (e.g., floor coverings), decks (e.g., deck coverings), textiles, cables, building materials and insulation, electrical equipment, transportation equipment (e.g., truck-bed liners), roofs (e.g., roof coating), and the like. Flame retardants are desirably used in two-part, isocyanate-base, curable systems to provide cured compositions with flame retardancy, but often such use is not a reality because of technical hurdles involved in incorporating flame retardants in two-part, curable systems.

Two-part, isocyanate-based, curable systems are well-known. Such systems generally include a compound having isocyanate functionality (NCO functionality) in a first part (or A-side) and a material reactive with the NCO functionality in a second part (or B-side). The first part and second part are typically stored in separate packages/containers until it is time to form the cured composition. At the time of use (i.e., time to form a cured composition) the first and second parts of such systems can be mixed together, applied to a surface or used in a desired manner, and allowed to cure (often at relatively low temperatures such as room temperature) to form a cured composition, such as a coating having useful properties such as a wide range of flexibility yet suitable toughness, high abrasion resistance, high chemical resistance, high acid etch resistance, high weatherability, and the like. Such coatings have found commercial success in vehicle products (e.g., truck bed liner), roof products (e.g., roof coating), and floor products (e.g., floor coating).

Materials that are reactive with isocyanate functionality to form such cured compositions include hydroxyl functional compounds to form polyurethanes, amine functional compounds to form polyureas, combinations of these, and the like.

Each part of the two-part curable system can desirably include additional ingredients that enhance the processing and/or handling of the parts (e.g., mixing the individual parts, mixing the parts together, applying the two-part mixture as a coating, and the like) and/or characteristics of the final cured composition. In general, it is desirable to incorporate the additional ingredients in one or both of the first and second parts so that fewer separate parts need to be handled prior to and at time of mixing the two parts. Optionally, additional components can be added as a third part at time of use (i.e., at the time of mixing the first and second part).

As mentioned, it is often desirable to include one or more flame retardants as additional ingredients in such two-part, isocyanate-based, curable systems. Certain desirable flame retardant ingredients, typically in solid form, for use in such curable systems are required to be present in relatively high amounts to be effective (e.g., greater than 25% by weight based on the total weight of the curable composition (e.g., first and second parts together)). Such flame retardant ingredients might have to be allocated among the first and second parts because loading such high levels of solids in only one part (e.g., 25% by weight of the total curable system is typically about 50% by weight of one part) tends to make that part hard to process and handle (e.g., the viscosity of that part is too high). Unfortunately, some flame retardant ingredients such as the phosphate-based, ammonium polyphosphate, and nitrogen-based, melamine are reactive with the NCO functionality in the first part of a two-part, isocyanate-based, curable system, and can result in undue reaction with the NCO functionality, e.g., prior to use such as during storage, and can compromise physical properties, rheological properties, curing properties, etc. While if used alone, such flame retardant ingredients tend not to be sufficiently effective.

Polyurethane, polyurethane/urea or polyurea polymer system systems have been provided in the form of coating compositions and solid body cast materials. See, e.g. U.S. Pat. No. 6,552,100.

There is a continuing need for new and improved flame retardant systems, especially those that can be used in two-part, isocyanate-based, curable systems to provide useful flame retardant properties in the cured composition.

SUMMARY OF THE INVENTION

The present invention provides a fire retardant coating system comprising:

a. a first part comprising at least one ingredient having NCO functionality; and b. a second part comprising at least one ingredient having an active hydrogen functionality that is co-reactive with the NCO; wherein the first part and the second part are formulated so that when the parts are mixed together they form a cured coating.

The coating system comprises at least three fire retardant ingredients that are:

i) a first fire retardant ingredient that is a phosphorus-based compound, ii) a second fire retardant ingredient that is an intumescent material; and iii) a third fire retardant ingredient that is a brominated ingredient additionally having an active hydrogen functionality that is co-reactive with the NCO of the first part. In a preferred embodiment, the first fire retardant ingredient is a phosphate-based compound.

Also provided are methods for preparing a fire retardant coating comprising providing a fire retardant coating system as described above and mixing the first part and the second part together so that they form a cured coating. The coating made by this process is also provided. Methods of protecting structures using the present coating system are also provided.

In another embodiment of the present invention, a solid body cast polyurethane, polyurethane/urea or polyurea polymer system comprising fire retardant comprises:

a. a first part comprising at least one ingredient having NCO functionality; and b. a second part comprising at least one ingredient having an active hydrogen functionality that is co-reactive with the NCO; wherein the first part and the second part are formulated so that when the parts are mixed together they form a cured solid body.

The solid body cast polymer system comprises at least three fire retardant ingredients that are:

i) a first fire retardant ingredient that is a phosphorus-based compound, ii) a second fire retardant ingredient that is an intumescent material; and iii) a third fire retardant ingredient that is a brominated ingredient additionally having an active hydrogen functionality that is co-reactive with the NCO of the first part. In a preferred embodiment, the first fire retardant ingredient is a phosphate-based compound.

In a preferred embodiment, the polymer of the solid body cast polymer system is elastomeric.

The present system, methods, and coatings advantageously provide effective fire retardancy in a product that is easy to prepare and apply to a surface in need of protection. Additionally, the solid body cast polymeric system, methods and articles provides unique fire retardant performance in articles that are not conventionally provided with the degree of fire retardancy that can be achieved by the systems of the present invention.

It has surprisingly been observed that there is an apparent synergistic effect in combination of the at least three fire retardant ingredients that are the first fire retardant ingredient that is a phosphorus-based compound, the second fire retardant ingredient that is an intumescent material and the third fire retardant ingredient that is a brominated ingredient. In an embodiment of the present invention, the brominated fire retardant ingredient is a brominated compound having an active hydrogen functionality that is co-reactive with the NCO of the first part. In another embodiment, the brominated fire retardant ingredient is a brominated compound having a functionality that is co-reactive with the active hydrogen of the second part.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The coating compositions of the present invention may be selected to form rigid or hard coatings, or to form elastomeric or resilient coatings. Likewise, the solid body cast polymer system compositions of the present invention may be selected to form rigid or hard solid bodies, or to form elastomeric or resilient solid bodies. For purposes of the present invention, a coating or a solid body is considered to be hard if it has a hardness of greater than about 90 Shore A, and is considered to be soft if it has a hardness of less than about 90 Shore A.

A flame retardant system according to the present invention can be used in any two-part, isocyanate-based, curable system. Two-part, isocyanate-based, curable systems, and methods of making and using them are well known. See, e.g., U.S. Pat. No. 5,798,409 (Ho), U.S. Pat. No. 5,587,448 (Engen), and U.S. Pat. No. 5,183,877 (Swanson), the entireties of which references are incorporated herein by reference.

Exemplary two-part, isocyanate-based, curable systems useful as the reactive component of the present coating system or solid body cast system according to the present invention are commercially available from, e.g., Polycoat Products, Santa Fe Springs, Calif., under the trade designations POLYEURO® MPL 55 and POLYEURO® 7502FR.

Further discussion of materials for forming the coatings and the solid body cast polymer is provided below.

The first fire retardant ingredient is a phosphorus-based compound. In a preferred embodiment, the first fire retardant ingredient is a phosphate-based compound. Particularly preferred ingredients that are phosphate-based compounds are tris(2,3-dibromopropyl)phosphate and other phosphate esters and the polyphosphates, preferably ammonium polyphosphate ("APP"). APP and methods of making APP are well known as described in, e.g., U.S. Pat. No. 5,165,904 (Staffel et al.), U.S. Pat. No. 5,277,887 (Staffel et al.), and U.S. Pat. No. 5,213,783 (Fukumura et al.), the disclosures of which are incorporated herein by reference.

In a preferred embodiment of the present invention, the phosphorus-based fire retardant is non-reactive with an isocyanate group, and therefore does not form a part of the polyurethane matrix through covalent bonding to a urethane group.

In another embodiment of the present invention, the phosphorus-based fire retardant is reactive with an isocyanate group, and therefore does form a part of the polyurethane matrix through covalent bonding to a urethane group.

The phosphorus-based fire retardant ingredient optionally can be pre-encapsulated, and preferably is encapsulated with an encapsulation material that additionally functions in support of fire retardancy. Examples of functional encapsulation materials include charring agents such as starch, dextrin, sorbitol pentaerythritol, phenol-formaldehyde resins or methylol melamine encapsulation materials, or the like. Particularly preferred fire retardant components include coated APP, which is well known as described in, e.g., U.S. Pat. No. 6,291,068 (Wang et al.), U.S. Pat. No. 5,599,626 (Fukumura et al.), and U.S. Pat. No. 5,534,291 (Fukumura et al.), the disclosures of which are incorporated herein by reference. A preferred melamine coated, APP fire retardant component for use in the present invention is commercially available from JLS Chemical Inc., Pomona, Calif., under the tradename JLS-APP101. This melamine coating has been found to enhance the flame retardancy properties of phosphorus-based compounds used in the fire retardant system of the invention. A preferred silicone coated, APP fire retardant component for use in the present invention is commercially available from JLS Fire retardants Chemical Inc., Pomona, Calif., under the tradename JLS-APP102.

The second fire retardant ingredient is an intumescent material. For purposes of the present invention, an intumescent fire retardant is a material that expands and forms a char layer as a barrier between the underlying material and surrounding environment. In one embodiment of the present invention, the fire retardant component is a material that expands as a result of a chemical reaction under heat. In another embodiment of the present invention, the fire retardant component is a material that expands as a result of a primarily physical reaction that occurs due to the configuration of components in the intumescent material.

In an embodiment of the present invention, preferred intumescent fire retardant components are expandable graphite-containing materials, such as expandable graphite flake. Expandable graphite is commercially available from Nyacol Nano Technologies, Inc., Ashland, Mass., under the tradename NYACOL® NYAGRAPH and from Graftach, Cleveland, Ohio, under the tradename GRAFGUARD 220-80N. Mixtures of intumescent fire retardant components are specifically contemplated.

The third fire retardant ingredient that is a brominated fire retardant ingredient. The brominated fire retardant ingredient may be provided as a brominated compound having a functional group that is co-reactive with the NCO of the first part or the active hydrogen of the second part of the coating system or the solid body cast system. This type of brominated fire retardant is referred to herein as the "reactive form." Alternatively, the brominated fire retardant ingredient may be provided as a brominated compound that is not co-reactive with the reactants of the first or second part of the coating or solid body cast system of the present invention. This type of brominated fire retardant is referred to herein as the "nonreactive form" or "additive form."

In the case where the brominated fire retardant ingredient is provided in the reactive form, the active hydrogen of the brominated fire retardant ingredient preferably is provided by a hydroxy functionality or by an amine functionality, or a mixture thereof. having a functionality that is co-reactive with the active hydrogen of the second part. Examples of such fire retardant ingredients include halogenated polyols, and in particular brominated polyols such as Firemaster® 520 fire retardant or PHT 4™ Diol fire retardant, both commercially available from Great Lakes Chemical Corporation, West Lafayette, Ind.; or Saytex 9170 or 9130 fire retardant from Albermarle Corp. Additional reactive brominated fire retardant compounds will now be apparent to the skilled artisan.

Examples of bromine fire retardants provided in the nonreactive form or additive form include, for example, bromine powder, commercially available as Saytex 102E from Albermarle Corporation or FR-522 from Bromine Compounds Ltd.

The fire retardant components are present in the fire retardant coating or in the solid body cast polymer system in an amount from about 10 to about 40% of the coating by weight.

In a preferred embodiment, the fire retardant component is from about 15 to about 35% of the coating by weight.

Optionally, in addition to the above recited fire retardant ingredients, the coating or the solid body cast polymer system may comprise one or more other fire retardant ingredients that operate by a mechanism different from intumescence. Examples of additional fire retardant components include the metallic oxides or hydroxides that contain water of hydration. Preferred metallic oxides or hydroxides include aluminum trihydride (ATH) and magnesium hydroxide, both of which provide fire retardancy from their inherent water content. Further examples of preferred additional fire retardant components include antimony trioxide and zinc borate.

The coating or the solid body cast polymer system is prepared as a polyurethane system from a first part and a second part that are reacted together as discussed above. The first part comprises at least one ingredient having NCO functionality, and preferably comprises one or more organic isocyanates having a functionality of two or higher. For example, organic diisocyanates, polyisocyanates, or mixtures thereof may be used successfully. The organic isocyanates may be aliphatic, cycloaliphatic, alicyclic, aromatic or aromatic aliphatic isocyanates.

Representative examples of optional isocyanate functional compounds include TDI, 4,4'-MDI, as well as other polyisocyanate materials listed or described in U.S. Pat. No. 6,262,217 (col. 3); U.S. Pat. No. 5,464,921 (col. 4); U.S. Pat. No. 5,288,797 (col. 4); U.S. Pat. No. 5,459,185 (col. 2); U.S. Pat. No. 5,603,798 (col. 3); U.S. Pat. No. 5,672,652 (col. 3); U.S. Pat. No. 5,852,103 (col. 3); U.S. Pat. No. 5,536,805 (col. 6 to col. 7); U.S. Pat. No. 4,426,488 (col. 4); U.S. Pat. No. 5,962,618 (col. 3 to col. 4); and U.S. Pat. No. 5,530,085 (col. 2). Others are also described in the *Encyclopedia of Chemical Technology*, Kirk-Othmer, 2d Ed., vol. 12, pp. 46-47 (1967). The various isocyanates suitable for the preparation of the coatings and the solid body cast polymer system of the invention are well known to those skilled in the art.

The second part comprises at least one ingredient having one or more active hydrogen functionalities that are co-reactive with the NCO, and preferably comprises one or more organic compounds having an active hydrogen functionality of two or higher. In an embodiment of the present invention, the active hydrogen of the second part is provided by ingredients having hydroxy functionalities. Preferred such compounds are polyols comprising more than one OH (hydroxyl) functional compounds, preferably comprising two or more hydroxyl groups, per molecule on average. The hydroxyl functional compounds may be aliphatic and/or aromatic. The hydroxyl functional compounds may be straight, cyclical, fused, and/or branched. In one embodiment, the preferred, hydroxyl functional compounds include at least one diol, at least one triol, and/or at least one tetrol. In other embodiments, the composition comprises polyols having 6-8 hydroxy functionalities. Compositions comprising higher numbers of active hydrogen functionalities are particularly preferred where coatings or the solid body cast polymer system having a high degree of rigidity is desired. Any of these polyol compounds may be monomeric, oligomeric, and/or polymeric as desired. If oligomeric and/or polymeric, the polyol(s) may be selected from one or more hydroxyl functional polyethers, polyesters, polyurethanes, polyacrylics, epoxy resins, polyamides, polyamines, polyureas, polysulfones, combinations of these, or the like. Polyether polyols are preferred as these are commercially available at relatively low cost and are hydrolytically stable.

In another embodiment of the present invention, the active hydrogens may be provided by amine functionalities. Preferred such compounds are polyamines comprising more than one NH or $NH_2$ (amine) functional compounds, preferably comprising two or more amine groups per molecule on average. The amine functional compounds may be aliphatic and/or aromatic. The amine functional compounds may be straight, cyclical, fused, and/or branched. In certain embodiments, the composition comprises polyamine compounds having 6-8 amine functionalities. Compositions comprising compounds having higher numbers of active hydrogen functionalities are particularly preferred where coatings or the solid bodies having a high degree of rigidity is desired. Any of these amine compounds may be monomeric, oligomeric, and/or polymeric as desired.

In one illustrative embodiment, the polyol component preferably includes at least one diol having a molecular weight in the range from about 500 to about 12,000, preferably from about 800 to about 8000; at least one triol preferably having a molecular weight in the range from 100 to about 12,000, more preferably 500 to 8000, and optionally a chain extender diol and/or diamine having a molecular weight up to about 500. In another embodiment, the polyol component preferably includes at least one polyol having 6-8 hydroxy functionalities and having a molecular weight in the range from about 100 to about 1000, preferably from about 300 to about 800. The amount of the diol(s), triol(s), other polyols and optional chain extender incorporated into the preferred polyol component may vary over a wide range with beneficial results. Generally, enough of the diol(s) are included to provide the desired degree of elastomeric characteristics, chain length, or other properties that are a function of the diol content; enough of the triol(s) to provide the desired degree of crosslinking; and enough of the chain extender to help build urethane/urea linkages as desired. As general guidelines, suitable formulations would include 10 to 100, preferably about 40 to 60 parts by weight of the diol(s), 0 to 50, preferably 5 to 25 parts by weight of the triol(s), and 0 to 15, preferably 2 to 10 parts by weight of optional chain extender(s) based upon 100 parts by weight of the polyol component. In other embodiments, the polyol component may contain only triol materials optionally in combination with 0 to 15 parts by weight of chain extender per 100 parts by weight of the polyol component. The various polyols suitable for the preparation of the coatings or the solid body cast polymer system of the invention are well known to those skilled in the art. These discussed ratios apply similarly when the active hydrogen is provided by amine functionalities.

In an embodiment of the present invention, the fire retardant coating may be coated on a reinforcement material. Preferably the reinforcement material is made from a refractory material, such as alumina-borosilicate fibers available as Nextel brand fibers from 3M Company of St. Paul, Minn. and other thermally resistant materials such as reinforced carbon-carbon fibers, silica fibers, alumina fibers, ceramic fibers and combinations thereof. Such heat resistant reinforcement is beneficial in preserving the char structure generated when the fire retardant coating is exposed to heat and/or flame. This is helpful for optimal performance of the fire retardant coating, because the char structure is fragile and is easily displaced under windy or friction conditions. In the case of severe fire conditions, conventional intumescents may not provide adequate protection, because forces such as air flow will disrupt the char structure of the fire retardant coating when exposed to fire, thereby exposing surfaces to heat and flame. Thus, the embodiment comprising a reinforcement material in or on the fire retardant coating provides even more improved protection from fire. In one embodiment, the reinforcement material is in the form of a continuous sheet material. In another embodiment, the reinforcement material is a non-continuous sheet material such as a perforated sheet or web material. In a particularly preferred embodiment, the reinforcement material is a woven or non-woven fabric made from natural or synthetic fibers.

The fire retardant coating or the solid body cast polymer system may optionally comprise fillers, colorants, ultraviolet light absorbers, fungicides, bactericides, dyes, pigments, aluminum flakes, biocides, and other such additives suitable for incorporation into the fire retardant coating or the solid body cast polymer system as will now be appreciated by the skilled artisan. Preferably, the coating layer or the solid body cast polymer system comprises an antimicrobial agent. Such an agent is particularly desirable in a coating construction or a solid body construction, which contains spaces and recesses that may be favorable for microbe growth.

Useful fillers include organic and/or inorganic filler. Exemplary inorganic fillers include sand, titania, clay, silica, fumed silica, combinations thereof, etc. Exemplary organic filler includes PVC, polystyrene, polypropylene, polyethylene, other olefinic fillers, combinations thereof, and the like. Preferred fillers include polyolefinic material such as polyethylene beads and/or polypropylene beads. Polyolefinic beads are lightweight and help provide cured compositions with high chemical resistance and high abrasion.

Suitable pigments include titanium dioxide, phthalocyanine blue, carbon black, basic carbonate white lead, zinc oxide, zinc sulfide, antimony oxide, zirconium oxide, lead sulfochromate, bismuth vanadate, bismuth molybdate, combinations thereof, etc.

Additional ingredients may be incorporated in the compositions of the present invention as will readily now be understood by the routineer. Such ingredients include catalysts, crosslinkers, surfactants, and, in the case of the polymer body composition, mold release agents.

A coating in accordance with the present invention may be prepared by any appropriate coating technique. For example the coating may be provided by use of a two-part spray device, or by use of a coating process such as by coextrusion, casting or by other coating processes.

A solid body may be formed in accordance with the present invention in any appropriate reaction system, commonly called either a cast system or, in certain embodiments, a reaction injection mold system. In this method, a fire retardant solid body cast system as described above is provided, and the first and second parts are mixed together and caused to cure in a mold so that they form a cured solid body.

In an embodiment of the present invention, the solid body is formed in a one-shot process, wherein the parts of the system are metered and mixed simultaneously and then poured into the mold. In another embodiment, the solid body is formed using a prepolymer or hot-cast system that is a two-step procedure. In this procedure, a prepolymer is formed, which may be a solid at ambient temperatures. The prepolymer is heated when mixed with other ingredients or parts to permit full mixing and flow into the mold. For this reason, solid body formation using a prepolymer in this manner often referred to as "hot-cast" or "hot-cure" processes. Solid bodies prepared in this manner exhibit excellent physical properties, such as elasticity, high modulus, resilience, and dimensional stability over a wide temperature range.

The coating system preferably is formulated to provide a final coating having a density of greater than 40 pounds per cubic foot ("pcf"), more preferably greater than 50 pcf, and most preferably greater than 60 pcf, In a preferred embodiment, the coating formulation is substantially free of blowing agents, so that no gas cells are formed in the final product.

Likewise, the solid bodies as described herein are not foam structures, and therefore do not comprise visually apparent gas cells. Preferably, the solid bodies have a density of greater than 40 pcf, more preferably greater than 50 pcf, and most preferably greater than 60 pcf, The solid body can be provided in a number of material selections that can provide alternative and beneficial physical properties. Thus, in an embodiment, the fire retardant body is either soft or hard. In an embodiment of the present invention, the fire retardant body is relatively hard and has a Shore D hardness of from about 40 to about 85. Embodiments of the present invention that are relatively hard are particularly beneficial as providing reinforcing structure. In another aspect of this embodiment, relatively hard fire retardant bodies can provide durable protection against scraping or similar physical assaults. In another embodiment of the present invention, the fire retardant body is relatively soft and has a Shore A hardness of from about 20 to about 115, more preferably from about 45 to about 100. Relatively soft embodiments are beneficial in providing cushioning protection from impact and the like.

In another embodiment the solid body is either flexible, not flexible, or rigid. In an embodiment of the present invention, the solid body is flexible, which is defined herein as being bendable to an angle of 45° preferably at a force less than about 300 g*cm, more preferably at a force of about 100 to about 240 g*cm, and most preferably at a force of about 150 to about 200 g*cm as measured by the Cantilever Bending Test (ASTM D5732). This embodiment is particularly beneficial in providing a material that can be readily flexed for positioning in the desired location. Thus, flexible fire retardant bodies can advantageously be easier to install is certain locations or product configurations.

In another embodiment of the present invention, the fire retardant body is not flexible, which is defined herein as requiring a force greater than 300 g*cm to bend to an angle of 45° as measured by the Cantilever Bending Test (ASTM D5732). In preferred aspects of this embodiment the fire retardant body requires a force greater than 500 g*cm or greater than 1000 g*cm to bend. This embodiment is advantageous in providing a stiff support structure, affording a reinforcement component to articles or structures to which the body may be attached. Alternatively, the non-flexible fire retardant body is advantageously self-supported.

In another embodiment, the fire retardant body is rigid, which is defined herein as being unable to be bent to an angle of 45° without breaking the fire retardant body. This embodiment advantageously provides stiff support to articles or structures to which the body may be attached. In an aspect of this embodiment, the non-flexible fire retardant body provides an article that is physically rigidly self-supported.

In another embodiment, the fire retardant body is elastic, having a Young's modulus of less than about 5 GPa, and more preferably less than about 1 GPa. An elastomeric fire retardant body of the present invention provides unique force absorbing properties in combination with the exceptional fire retardancy properties as discussed herein. Such fire retardant bodies find particular advantageous use in protection from blast damage. Additionally, the use of an elastic fire retardant body in construction applications can significantly enhance durability of the ultimate construction.

In an embodiment of the present invention, the fire retardant body has a % elongation of from about 2% to about 10% as measured by ASTM test D412. In an embodiment of the present invention, the fire retardant body has a % elongation of from about 5% to about 60% as measured by ASTM test D412.

In another embodiment, the fire retardant body has a Tensile Strength of from about 1200 to about 3000 PSI as measured by ASTM test D412.

EXAMPLES

Representative embodiments of the present invention will now be described with reference to the following examples that illustrate the principles and practice of the present invention.

The fire retardant coating or the solid body cast polymer system is formed from resins having the compositions as indicated below.

Testing of the Samples
    Candle test: The film was cut into ½" wide, 3" to 4" long strips. The strips were ignited by a candle in horizontal and vertical position. Check the flame propagation, speed of burning and type of smoke generation.

Fire Rating:
1—Burns completely
2—Slight resistance to fire but continuous burn
3—Flame extinguished after 3 to 5 seconds
4—Self extinguished immediately after flame is removed Materials:

| Chemical Description & formula | Chemical Description | Name of Supplier |
|---|---|---|
| 1,4 Butane Diol | 1,4 Butane Diol | BASF Corp |
| 85% PHOSPHORIC ACID (10% DILUTED) | Phosphoric acid | Spectrum laboratory Products |
| Aerosil R 972 | Hydrophobic Silicon Dioxide | Degussa Huls Corp, |
| ANCAMINE 2049 | cylcoaliphatic amine | Air Products & Chemicals inc |
| APR 101 | Ammonium Polyphospahte Melamine | JLS Flame retardant Chemicals Co. |
| APP-102 | Ammonium polyphosphate | JLS Flame retardant Chemicals Co. |
| Black Pigment paste 216A | Carbon Black | Ryvac Inc |
| Bentone 34 | Bentonite clay | Elementis Specialties |
| BLACK PASTE 216A | carbon Black | Ryvac, Inc |
| BYK 085 | Polymethyl Alkyl Siloxane | BYK-Chemie |
| BYK 361 | Acrylate Copolymer | BYK-Chemie |
| BYK 85 | Methylalkyl polysiloxane | BYK-Chemie |

| Chemical Description & formula | Chemical Description | Name of Supplier |
|---|---|---|
| Castor Oil #1 | Tri Glyceride of Ricinoleic Acid | Cambell & Co., |
| CATALYST 315 | Bismuth Neodecanoate | OMG Americas Inc |
| CLEARLINK 1000 | Cyclohexamine, 4,4' methylenebis(n-(1-methylpropyl) | Dorf-ketal chemicals |
| DABCO 1027 | Triethylenamine | Air Products & Chemicals inc |
| Dabco 33LV | Tertiary amine | Air Products |
| Desmodur I | Isophorone Diisocyanate | Bayer Inc. |
| DINP based white paste | Titanium dioxide in DINP | Polycoat Products |
| Disperbyk 1142 | Mixer | BYK-Chemie |
| Ethacure 100 | Diethyl Toluene Diamine | Albermarle Corp |
| Exolit OP 550 | Polymeric ester of ethylene glycol & Phosphoric acid with ethyl & hydroxyl alkyl group | Clarient Corp. |
| Firemaster 520 | Helogenated Aromatic diol | Great lake Chemicals corp. |
| Formez SUL-4 | Dibutyltin dilaurate | Crompton Corp. |
| GRAFGUARD 160-80N | Acid treated Graphite | GrafTech Inc |
| Lupranate 5030 | 4,4 MDI | BASF Corp. |
| Lupranate MP102 | 4,4 MDI | BASF Corp. |
| Lupranate MM 103 | 4,4 MDI | BASF Corp. |
| Lupranate M 20 S | 4,4 MDI | BASF Corp. |
| Mol Sieve CECA NK 30 AP | Sodium Potassium Alumino Silicate | Basic Chemicals |
| Mondur CD | 4,4 MDI | BASF Corp. |
| MONDUR MRS-5 | 4,4 MDI | Bayer Inc |
| PDI Black 48-88030 | Black pigment paste | Ferro Corp. |
| PEA D- 2000 | Aliphatic diamine | BASF Corp. |
| PLURACOL 1421 | Polyether Triol | BASF Corp. |
| PLURACOL P 1010 | Polyether diol | BASF Corp. |
| POLYCAT SA-1 | Amine salt | Air Products & Chemicals inc |
| Propylene Carbonate | Propylene Carbonate | BASF Corp. |
| Quadrol | Tetra Hydroxy Propyl Ethylene Diamine | BASF Corp. |
| SAG 47 | Modified Polydimethylsiloxane | Crompton Corp. |
| Satex 102E | Decabromodiphenyl Oxide | Albemarle Corporation |
| SILQUEST A-187 | Silane, trimethoxy(3-oxiraylmethoxy) propyl | Crompton Corp. |
| Suspino 201NBA | Wax solution in n-butyl acetate | Poly-Resyn Inc |
| THIXIN E | Bentonite clay | Elementis Specialties |
| Tinuvin 1130 | Mixture | Ciba Specialty Chem Corp |
| Tinuvin 292 | Mixture | Ciba Specialty Chem Corp |
| Tolonate HDT | 1,6 HDI | Rhodia Inc |
| UL 29 | Trade secret | Crompton Corp. |
| UNILINK 4200 | N,N' dialkylamine diphenylmethane | UOP LLC |
| Vistamine IPD | Isophorone diamine | CreaNova Inc |
| Yellow Paste | Yoellow iron oxide in DINP | Polycoat products |

Example Formulations and Experimental Results
A. Cast Bodies

| | CAST ELASTOMER 90A | | | | | | |
|---|---|---|---|---|---|---|---|
| NAME | Example #1 | Example #2 | Example #3 | Example #4 | Example #5 | Example #6 | Example #7 |
| A side | | | | | | | |
| Lupranate MP 102 | 100 | 100 | 100 | 100 | 100 | 100 | 100 |
| TOTAL | 100.00 | 100.00 | 100.00 | 100.00 | 100.00 | 100.00 | 100.00 |
| #/gallon | 10.00 | 10.00 | 10.00 | 10.00 | 10.00 | 10.00 | 10.00 |
| B side | | | | | | | |
| PLURACOL 1421 | 78.80 | 53.1 | 26.1 | 45.1 | 17.6 | 22.1 | 28.4 |
| 1,4 BUTANE DIOL | 16.25 | 18 | 20 | 17 | 10.5 | 15 | 15 |
| SAG 47 | 0.1 | 0.1 | 0.1 | 0.1 | 0.1 | 0.1 | 0.1 |
| MOL. SIEVES CECA NK 30 AP UNISIV 3A | 1.00 | 0.5 | 0.5 | 0.5 | 0.5 | 0.5 | 0.5 |

CAST ELASTOMER 90A

| NAME | Example #1 | Example #2 | Example #3 | Example #4 | Example #5 | Example #6 | Example #7 |
|---|---|---|---|---|---|---|---|
| POWDER | | | | | | | |
| AEROSIL 972 | 0.50 | 0.5 | 0.5 | 0.5 | 0.5 | 0.5 | 0.5 |
| YELLOW 681 PASTE | 2.50 | 2.5 | 2.5 | 2.5 | 2.5 | 2.5 | 2.5 |
| FIREMASTER 520 | | | | 14 | 28 | 14 | |
| EXOLIT OP-550 | | | | 20 | 40 | 20 | 14 |
| SAYTEX 102E | | | | | | | 7.75 |
| APP102 | | 15 | 30 | | | 15 | 15 |
| GRAFGUARD 160-80N | | 10 | 20 | | | 10 | 10 |
| Thorcat 535 | 0.2 | 0.2 | 0.2 | 0.2 | 0.2 | 0.2 | 0.2 |
| DABCO 33LV | 0.1 | 0.1 | 0.1 | 0.1 | 0.1 | 0.1 | 0.1 |
| TOTAL | 100 | 100 | 100 | 100 | 100 | 100 | 100 |
| #/gallon | 8.5 | 10.2 | 10.3 | 10.2 | 10.3 | 10.2 | 10.2 |
| Mixing Ratio by weight | | | | | | | |
| A | 80 | 80 | 80 | 80 | 80 | 80 | 80 |
| B | 100 | 100 | 100 | 100 | 100 | 100 | 100 |
| Hardness | 95A | 98A | 98A | 90A | 90A | 98A | 98A |
| Fire Rating (Candle test) | 1 | 2 | 3 | 1 | 3 | 4 | 3 |

CAST ELASTOMER 55D

| NAME | Example #8 | Example #9 | Example #10 | Example #11 | Example #12 | Example #13 |
|---|---|---|---|---|---|---|
| A side | | | | | | |
| Lupranate MM 103 | 82.45 | 82.45 | 82.45 | 82.45 | 82.45 | 82.45 |
| PROPYLENE CARBONATE | 4.3 | 4.3 | 4.3 | 4.3 | 4.3 | 4.3 |
| DIPROPYLENE GLYCOL | 4 | 4 | 4 | 4 | 4 | 4 |
| POLY G 20-112 | 9.4 | 9.4 | 9.4 | 9.4 | 9.4 | 9.4 |
| SAG 47 | 0.01 | 0.01 | 0.01 | 0.01 | 0.01 | 0.01 |
| 10% PHOSPHORIC ACID | 0.025 | 0.025 | 0.025 | 0.025 | 0.025 | 0.025 |
| TOTAL | 100.19 | 100.19 | 100.19 | 100.19 | 100.19 | 100.19 |
| #/gallon | 9.99 | 9.99 | 9.99 | 9.99 | 9.99 | 9.99 |
| B side | | | | | | |
| PLURACOL P380 | 69.7 | 43 | 18 | 39.7 | 8.7 | 13.7 |
| 1,4 BUTANE DIOL | 9 | 10 | 10 | 5 | 2 | 6 |
| ETHACURE 100 | 1 | 1 | 1 | 1 | 1 | 1 |
| VORANOL 76-635 | 20 | 20 | 20 | 20 | 20 | 20 |
| SAG 47 | 0.1 | 0.1 | 0.1 | 0.1 | 0.1 | 0.1 |
| AEROSIL 972 | | 0.75 | 0.75 | | | |
| FIREMASTER 520 | | | | 14 | 28 | 14 |
| EXOLIT OP-550 | | | | 20 | 40 | 20 |
| APP102 | | 15 | 30 | | | 15 |
| GRAFGUARD 160-80N | | 10 | 20 | | | 10 |
| THORCAT 535 | 0.2 | 0.2 | 0.2 | 0.2 | 0.2 | 0.2 |
| TOTAL | 100 | 100.05 | 100.05 | 100 | 100 | 100 |
| #/gallon | 8.7 | 10.2 | 10.3 | 10.2 | 10.3 | 10.3 |
| Mixing Ratio by weight | | | | | | |
| A | 118 | 118 | 118 | 118 | 118 | 118 |
| B | 100 | 100 | 100 | 100 | 100 | 100 |
| Hardness | 55D | 59D | 59D | 52D | 52D | 60D |
| Fire Rating (Candle test) | 1 | 2 | 3 | 1 | 3 | 4 |

| CAST ELASTOMER 80A | | | | | | |
|---|---|---|---|---|---|---|
| NAME | Example #14 | Example #15 | Example #16 | Example #17 | Example #18 | Example #19 |
| A side | | | | | | |
| Lupranate 5030 | 100 | 100 | 100 | 100 | 100 | 100 |
| TOTAL | 100 | 100 | 100 | 100 | 100 | 100 |
| #/gallon | 10.00 | 10.00 | 10.00 | 10.00 | 10.00 | 10.00 |
| B side | | | | | | |
| PLURACOL 1421 (BASF) | 89.7 | 63 | 39 | 59.2 | 29.2 | 32.5 |
| POLY G 85-36 (ARCH) | | | | | | |
| 1,4 BUTANE DIOL | 10 | 11 | 10 | 6.5 | 2.5 | 7.5 |
| SAG 47 | 0.1 | 0.1 | 0.1 | 0.1 | 0.1 | 0.1 |
| AEROSIL 972 (D&J) | | 0.75 | 0.75 | | | 0.75 |
| WACKER HDK H-15 (SEEGOTT) | | | | | | |
| FIREMASTER 520 | | | | 14 | 28 | 14 |
| EXOLIT OP-550 | | | | 20 | 40 | 20 |
| APP102 | | 15 | 30 | | | 15 |
| GRAFGUARD 160-80N | | 10 | 20 | | | 10 |
| THORCAT 535 | 0.175 | 0.175 | 0.175 | 0.175 | 0.175 | 0.175 |
| DABCO 33LV | 0.00257 | 0.00257 | 0.00257 | 0.00257 | 0.00257 | 0.00257 |
| TOTAL | 100 | 100.03 | 100.03 | 99.98 | 99.98 | 100.03 |
| #/gallon | 8.7 | 10.2 | 10.3 | 10.2 | 10.3 | 10.3 |
| Mixing Ratio by weight | | | | | | |
| A | 66.7 | 66.7 | 66.7 | 66.7 | 66.7 | 66.7 |
| B | 100 | 100 | 100 | 100 | 100 | 100 |
| Hardness | 80A | 84A | 84A | 76A | 76A | 83A |
| Fire Rating (Candle test) | 1 | 2 | 3 | 1 | 3 | 4 |

| CAST ELASTOMER 70A | | | | | | |
|---|---|---|---|---|---|---|
| NAME | Example #20 | Example #21 | Example #22 | Example #23 | Example #24 | Example #25 |
| A side | | | | | | |
| Lupranate 5030 | 100 | 100 | 100 | 100 | 100 | 100 |
| TOTAL | 100 | 100 | 100 | 100 | 100 | 100 |
| #/gallon | 10.00 | 10.00 | 10.00 | 10.00 | 10.00 | 10.00 |
| B side | | | | | | |
| PLURACOL 1421 (BASF) | 91 | 65 | 39.1 | 61.1 | 29.6 | 34.6 |
| POLY G 85-36 (ARCH) | | | | | | |
| 1,4 BUTANE DIOL | 6.8 | 7.5 | 8.5 | 2.5 | 0 | 4 |
| SAG 47 | 0.1 | 0.1 | 0.1 | 0.1 | 0.1 | 0.1 |
| MOL. SIEVES CECA NK 30 AP UNISIV 3A POWDER | 2 | 2 | 2 | 2 | 2 | 2 |
| AEROSIL 972 | 0.3 | 0.3 | 0.3 | 0.3 | 0.3 | 0.3 |
| FIREMASTER 520 | | | | 14 | 28 | 14 |
| EXOLIT OP-550 | | | | 20 | 40 | 20 |
| APP102 | | 15 | 30 | | | 15 |
| GRAFGUARD 160-80N | | 10 | 20 | | | 10 |
| FOMREZ UL-29 | 0.021 | 0.021 | 0.021 | 0.021 | 0.021 | 0.021 |
| TOTAL | 100 | 99.92 | 100.02 | 100.02 | 100.02 | 100.02 |
| #/gallon | 8.6 | 10.1 | 10.3 | 10.1 | 10.3 | 10.3 |
| Mixing Ratio by weight | | | | | | |
| A | 49 | 49 | 49 | 49 | 49 | 49 |
| B | 100 | 100 | 100 | 100 | 100 | 100 |
| Hardness | 70A | 73A | 73A | 68A | 68A | 75A |
| Fire Rating (Candle test) | 1 | 2 | 3 | 1 | 3 | 4 |

| CAST ELASTOMER 80D | | | | | | |
|---|---|---|---|---|---|---|
| NAME | Example #26 | Example #27 | Example #28 | Example #29 | Example #30 | Example #31 |
| A side | | | | | | |
| Lupranate MP 102 | 100 | 100 | 100 | 100 | 100 | 100 |
| TOTAL | 100.00 | 100.00 | 100.00 | 100.00 | 100.00 | 100.00 |
| #/gallon | 10.00 | 10.00 | 10.00 | 10.00 | 10.00 | 10.00 |
| B side | | | | | | |
| PLURACOL P380 | 51.4 | 25.6 | 0.3 | 20.3 | 1.7 | 0 |
| 1,4 BUTANE DIOL | 11.8 | 13 | 13 | 9 | 12.3 | 13 |
| ETHACURE 100 | 1 | 1 | 1 | 1 | 1 | 1 |
| VORANOL 76-635 | 30.9 | 30.9 | 30.9 | 30.9 | 12.2 | 22.2 |
| SAG 47 | 0.05 | 0.05 | 0.05 | 0.05 | 0.05 | 0.05 |
| MOL. SIEVES CECA NK 30 AP UNISIV 3A POWDER | 2 | 2 | 2 | 2 | 2 | 2 |
| AEROSIL 972 | 0.5 | 0.5 | 0.5 | 0.5 | 0.5 | 0.5 |
| BLACK PIGMENT PASTE 216A | 2 | 2 | 2 | 2 | 2 | 2 |
| FIREMASTER 520 | | | | 14 | 28 | 14 |
| EXOLIT OP-550 | | | | 20 | 40 | 20 |
| APP102 | | 15 | 30 | | | 15 |
| GRAFGUARD 160-80N | | 10 | 20 | | | 10 |
| THORCAT 535 | 0.3 | 0.3 | 0.3 | 0.3 | 0.3 | 0.3 |
| DABCO 33LV | 0.005 | 0.005 | 0.005 | 0.005 | 0.005 | 0.005 |
| TOTAL | 100 | 100.36 | 100.06 | 100.06 | 100.06 | 100.06 |
| #/gallon | 8.7 | 10.1 | 10.3 | 10.1 | 10.3 | 10.5 |
| Mixing Ratio by weight | | | | | | |
| A | 127 | 127 | 127 | 127 | 127 | 127 |
| B | 100 | 100 | 100 | 100 | 100 | 100 |
| Hardness | 80D | 80D | 80D | 76D | 76D | 80D |
| Fire Rating (Candle test) | 1 | 2 | 3 | 1 | 3 | 4 |

B. Coatings

| SPRAY ELASTOMER 80A | | | | | | | |
|---|---|---|---|---|---|---|---|
| NAME | Example #32 | Example #33 | Example #34 | Example #35 | Example #36 | Example #37 | Example #38 |
| A-SIDE | | | | | | | |
| PLURACOL P2010 (BASF) | 40.78 | 33.8 | 33.8 | 33.8 | 33.8 | 33.8 | 33.8 |
| BYK 085 | 0.01 | 0.007 | 0.007 | 0.007 | 0.007 | 0.007 | 0.007 |
| DISPERBYK 1142 | | 0.5 | 0.5 | 0.5 | 0.5 | 0.5 | 0.5 |
| APP102 | | 15 | 15 | 15 | 15 | 15 | 15 |
| BENTONE 34 | | 0.5 | 0.5 | 0.5 | 0.5 | 0.5 | 0.5 |
| PROPYLENE CARBONATE | 7 | 5.88 | 5.88 | 5.88 | 5.88 | 5.88 | 5.88 |
| MONDUR CD, BASF | 52.1 | 43.82 | 43.82 | 43.82 | 43.82 | 43.82 | 43.82 |
| SUSPNO #201NBA | | 0.5 | 0.5 | 0.5 | 0.5 | 0.5 | 0.5 |
| 85% PHOSPHORIC ACID (10%) DILUTION | 0.024 | 0.025 | 0.025 | 0.025 | 0.025 | 0.025 | 0.025 |
| TOTAL | 99.90 | 100.03 | 100.03 | 100.03 | 100.03 | 100.03 | 100.03 |
| #/gallon | 9.39 | 10.01 | 10.01 | 10.01 | 10.01 | 10.01 | 10.01 |
| B-SIDE | | | | | | | |
| PLURACOL P1010 | 19.92 | 19.92 | 9.6 | 18.5 | | 9.1 | 9.1 |
| PLURACOL 1421 (BASF) | 53.77 | 30.2 | 15.5 | 29 | 21.5 | 14 | 20.2 |
| BYK 085 | 0.1 | 0.1 | 0.1 | 0.1 | 0.1 | 0.1 | 0.1 |
| AEROSIL 972 | 0.3 | 0.4 | 0.4 | 0.4 | 0.4 | 0.4 | 0.4 |
| RYVEC 216A BLACK PASTE | 4.88 | 5 | 5 | 5 | 5 | 5 | 5 |
| SUSPNO #201NBA | | 0.5 | 0.5 | | | 0.5 | 0.5 |
| APP 102 | | 15 | 30 | | | 15 | 15 |

-continued

| SPRAY ELASTOMER 80A | | | | | | | |
|---|---|---|---|---|---|---|---|
| NAME | Example #32 | Example #33 | Example #34 | Example #35 | Example #36 | Example #37 | Example #38 |
| GRAFGUARD 160-80N | | 10 | 20 | | | 10 | 10 |
| FIREMASTER 520 | | | | 14 | 28 | 14 | |
| EXOLIT OP-550 | | | | 20 | 40 | 20 | 20 |
| SATTEX 102E | | | | | | | 7.75 |
| ETHACURE 100 | 10.43 | 10.43 | 10.43 | 7 | | 6 | 6 |
| DISPERBYK 1142 | | 0.48 | 0.48 | 0.48 | 0.48 | 0.48 | 0.48 |
| ANCAMINE 2049 | 2 | 2 | 2 | 2 | 1 | 2 | 2 |
| 1,4 BUTANE DIOL | 4.98 | 2.5 | 2.5 | | | | |
| MOL. SIEVES CECA NK 30 AP | 2.98 | 3 | 3 | 3 | 3 | 3 | 3 |
| FOAMREZ SUL-4 | | 0.04 | 0.04 | 0.04 | 0.04 | 0.04 | 0.04 |
| POLYCAT SA-1 CATALYST | | 0.04 | 0.04 | 0.04 | 0.04 | 0.04 | 0.04 |
| DABCO 1027 CATALYST | | 0.4 | 0.4 | 0.4 | 0.4 | 0.4 | 0.4 |
| DABCO 33 LV | 0.244 | | | | | | |
| CATALYST 315 | 0.244 | | | | | | |
| TOTAL | 99.79 | 100.01 | 99.99 | 99.96 | 99.96 | 100.06 | 100 |
| #/gallon | 8.66 | 10.10 | 11.59 | 10.04 | 11.95 | 11.61 | 11.6 |
| Mixing Ratio by volume | | | | | | | |
| A | 1 | 1 | 1 | 1 | 1 | 1 | 1 |
| B | 1 | 1 | 1 | 1 | 1 | 1 | 1 |
| Hardness | 82A | 90A | 90A | 75A | 74A | 85A | 85A |
| (Fire Rating) Candle test | 1 | 1 | 3 | 1 | 3 | 4 | 3 |

| SPRAY ELASTOMER 50D | | | | | | | |
|---|---|---|---|---|---|---|---|
| | Example #39 | Example #40 | Example #41 | Example #42 | Example #43 | Example #44 | Example #45 |
| A SIDE | | | | | | | |
| MONDUR CD | 62.9 | 58.37 | 58.37 | 58.37 | 58.37 | 58.37 | 58.37 |
| PROPYLENE CARBONATE | 7 | 6.2 | 6.2 | 6.2 | 6.2 | 6.2 | 6.2 |
| BYK 085 | 0.01 | 0.04 | 0.04 | 0.04 | 0.04 | 0.04 | 0.04 |
| PLURACOL P1010 | | | | | | | |
| POLY G 20-112 | 30 | 19 | 19 | 19 | 19 | 19 | 19 |
| 85% PHOSPHORIC ACID (10%) DILUTION | 0.024 | 0.025 | 0.025 | 0.025 | 0.025 | 0.025 | 0.025 |
| APP102 | | 15 | 15 | 15 | 15 | 15 | 15 |
| DISPERBYK 1142 | | 0.4 | 0.4 | 0.4 | 0.4 | 0.4 | 0.4 |
| BENTONE 34 | | 0.5 | 0.5 | 0.5 | 0.5 | 0.5 | 0.5 |
| SUSPENO #201 | | 0.5 | 0.5 | 0.5 | 0.5 | 0.5 | 0.5 |
| NBA | | | | | | | |
| TOTAL | 99.93 | 100.035 | 100.035 | 100.035 | 100.035 | 100.035 | 100.035 |
| #/gallon | 9.62 | 10.37 | 10.37 | 10.37 | 10.37 | 10.37 | 10.37 |
| B SIDE | | | | | | | |
| PLURACOL P1010 | 73.98 | 48.9 | 23.9 | 43.4 | 15.4 | 18.9 | 25.4 |
| ETHACURE 100 | 17.47 | 17 | 17 | 17 | 11 | 15 | 15 |
| 1,4 BUTANE DIOL | 1.09 | 3 | 3 | 0 | 0 | 1 | 1 |
| SAG 47 | 0.0067 | 0.004 | 0.004 | 0.004 | 0.004 | 0.004 | 0.004 |
| MOL. SIEVES CECA NK 30 AP | 2 | 1.26 | 1.26 | 1.26 | 1.26 | 1.26 | 1.26 |
| AEROSIL 972 | 0.2 | 0.7 | 0.7 | 0.7 | 0.7 | 0.7 | 0.7 |
| TINUVIN 292 | 0.33 | 0.2 | 0.2 | 0.2 | 0.2 | 0.2 | 0.2 |
| RYVEC 216A BLACK PASTE | 4.5 | 2.79 | 2.79 | 2.79 | 2.79 | 2.79 | 2.79 |
| APP 102 | | 15 | 30 | | | 15 | 15 |
| GRAFGUARD 160-80N | | 10 | 20 | | | 10 | 10 |
| FIREMASTER 520 | | | | 14 | 28 | 14 | |
| EXOLIT OP-550 | | | | 20 | 40 | 20 | 20 |

SPRAY ELASTOMER 50D

|  | Example #39 | Example #40 | Example #41 | Example #42 | Example #43 | Example #44 | Example #45 |
|---|---|---|---|---|---|---|---|
| SUSPENO #201 NBA |  | 0.5 | 0.5 |  |  | 0.5 | 0.5 |
| SAYTEX 102E |  |  |  |  |  |  | 7.75 |
| DISPERBYK 1142 |  | 0.21 | 0.21 | 0.21 | 0.21 | 0.21 | 0.21 |
| FOAMREZ SUL-4 |  | 0.04 | 0.04 | 0.04 | 0.04 | 0.04 | 0.04 |
| PC CAT TD-33 | 0.25 | 0 | 0 | 0 | 0 | 0 | 0 |
| CATALYST-315 | 0.2 | 0 | 0 | 0 | 0 | 0 | 0 |
| POLYCAT SA-1 CATALYST |  | 0.04 | 0.04 | 0.04 | 0.04 | 0.04 | 0.04 |
| DABCO 1027 CATALYST |  | 0.4 | 0.4 | 0.4 | 0.4 | 0.4 | 0.4 |
| TOTAL | 100.03 | 100.04 | 100.04 | 100.04 | 100.04 | 100.04 | 100.04 |
| #/gallon | 8.56 | 9.77 | 11.43 | 9.91 | 11.79 | 11.61 | 11.61 |
| Mixing Ratio by volume |  |  |  |  |  |  |  |
| A | 1 | 1 | 1 | 1 | 1 | 1 | 1 |
| B | 1 | 1 | 1 | 1 | 1 | 1 | 1 |
| Hardness | 50D | 55D | 55D | 45D | 44D | 53D | 53D |
| (Fire Rating) Candle test | 1 | 1 | 3 | 1 | 3 | 4 | 3 |

SPRAY ELASTOMER 55D

|  | Example #46 | Example #47 | Example #48 | Example #49 | Example #50 | Example #51 |
|---|---|---|---|---|---|---|
| A SIDE |  |  |  |  |  |  |
| MONDUR CD, BASF | 62.9 | 58.37 | 58.37 | 58.37 | 58.37 | 58.37 |
| PROPYLENE CARBONATE | 7 | 6.2 | 6.2 | 6.2 | 6.2 | 6.2 |
| BYK 085 | 0.01 | 0.04 | 0.04 | 0.04 | 0.04 | 0.04 |
| PLURACOL P1010 POLY G 20-112 | 30 | 19 | 19 | 19 | 19 | 19 |
| 85% PHOSPHORIC ACID (10%) DILUTION | 0.024 | 0.025 | 0.025 | 0.025 | 0.025 | 0.025 |
| APP102 |  | 15 | 15 | 15 | 15 | 15 |
| DISPERBYK 1142 |  | 0.4 | 0.4 | 0.4 | 0.4 | 0.4 |
| BENTONE 34 |  | 0.5 | 0.5 | 0.5 | 0.5 | 0.5 |
| SUSPENO #201 NBA |  | 0.5 | 0.5 | 0.5 | 0.5 | 0.5 |
| TOTAL | 99.93 | 100.04 | 100.04 | 100.04 | 100.04 | 100.04 |
| #/gallon | 9.62 | 10.37 | 10.37 | 10.37 | 10.37 | 10.37 |
| B SIDE |  |  |  |  |  |  |
| PLURACOL 1421 (BASF) POLY G 85-36 (ARCH) | 67.3 | 42.1 | 20 | 39.7 | 15.6 | 15 |
| ETHACURE 100 | 17.6 | 17.8 | 15 | 15 | 7 | 16 |
| 1,4 BUTANE DIOL | 6.2 | 5 | 5 | 2 | 0 | 0 |
| SAG 47 | 0.0067 | 0.004 | 0.004 | 0.004 | 0.004 | 0.004 |
| MOL. SIEVES CECA NK 30 AP UNISIV 3A POWDER | 3 | 3 | 3 | 3 | 3 | 3 |
| AEROSIL 972 (D&J) | 0.2 | 0.7 | 0.7 | 0.7 | 0.7 | 0.7 |
| TINUVIN 292 | 0.33 | 0.2 | 0.2 | 0.2 | 0.2 | 0.2 |
| RYVEC 216A BLACK PASTE ALTERNATE FOR CL-00716 | 5 | 5 | 5 | 5 | 5 | 5 |
| PC CAT TD-33 | 0.184 | 0 | 0 |  |  | 0 |
| CATALYST-315 | 0.135 | 0 | 0 |  |  | 0 |
| SUSPENO #201 NBA |  | 0.5 | 0.5 | 0 | 0 | 0.5 |
| APP 102 |  | 15 | 30 | 0 | 0 | 15 |
| GRAFGUARD 160-80N |  | 10 | 20 | 0 | 0 | 10 |
| FIREMASTER 520 |  |  |  | 14 | 28 | 14 |
| EXOLIT OP-550 |  |  |  | 20 | 40 | 20 |
| DISPERBYK 1142 |  | 0.2 | 0.2 | 0 | 0 | 0.2 |
| FOAMREZ SUL-4 |  | 0.04 | 0.04 | 0.04 | 0.04 | 0.04 |
| DABCO T-12 |  |  |  |  |  |  |

SPRAY ELASTOMER 55D

|  | Example #46 | Example #47 | Example #48 | Example #49 | Example #50 | Example #51 |
|---|---|---|---|---|---|---|
| POLYCAT SA-1 CATALYST |  | 0.04 | 0.04 | 0.04 | 0.04 | 0.04 |
| DABCO 1027 CATALYST |  | 0.4 | 0.4 | 0.4 | 0.4 | 0.4 |
| TOTAL | 100.00 | 99.98 | 100.08 | 100.08 | 99.98 | 100.08 |
| #/gallon | 8.70 | 9.97 | 11.63 | 10.08 | 11.98 | 11.81 |
| Mixing Ratio by volume |  |  |  |  |  |  |
| A | 1 | 1 | 1 | 1 | 1 | 1 |
| B | 1 | 1 | 1 | 1 | 1 | 1 |
| Hardness | 55D | 57D | 59D | 52D | 52D | 57D |
| (Fire Rating) Candle test | 1 | 1 | 3 | 1 | 3 | 4 |

SPRAY ELASTOMER 75D

|  | Example #52 | Example #53 | Example #54 | Example #55 | Example #56 | Example #57 |
|---|---|---|---|---|---|---|
| A SIDE |  |  |  |  |  |  |
| PLURACOL 1421 (BASF) | 26.1 | 20.8 | 20.8 | 20.8 | 20.8 | 20.8 |
| 85% PHOSPHORIC ACID (10%) DILUTION | 0.024 | 0.025 | 0.025 | 0.025 | 0.025 | 0.025 |
| BYK 085 |  | 0.05 | 0.05 | 0.05 | 0.05 | 0.05 |
| DISPERBYK 1142 |  | 0.4 | 0.4 | 0.4 | 0.4 | 0.4 |
| APP102 |  | 15 | 15 | 15 | 15 | 15 |
| BENTONE 34 |  | 0.5 | 0.5 | 0.5 | 0.5 | 0.5 |
| PROPYLENE CARBONATE |  | 0.5 | 0.5 | 0.5 | 0.5 | 0.5 |
| SUSPENO #201 NBA |  | 0.5 | 0.5 | 0.5 | 0.5 | 0.5 |
| MONDUR MRS-5 | 73.85 | 62.27 | 62.27 | 62.27 | 62.27 | 62.27 |
| TOTAL | 99.95 | 100.05 | 100.05 | 100.05 | 100.05 | 100.05 |
| #/gallon | 9.73 | 10.35 | 10.35 | 10.35 | 10.35 | 10.35 |
| B SIDE |  |  |  |  |  |  |
| CASTOR OIL AA STD. | 69.4 |  |  |  |  |  |
| POLY G 20-265 |  | 58.2 | 30.2 | 50.3 | 21.3 | 24.2 |
| ETHACURE 100 | 4 | 3 | 3 | 3 | 3 | 3 |
| 1,4 BUTANE DIOL | 3.4 | 0 | 3 | 5 | 0 | 0 |
| QUADROL (BASF) | 18.2 | 10 | 10 | 5 | 5 | 10 |
| FIREMASTER 520 |  | 0 | 0 | 14 | 28 | 14 |
| EXOLIT OP-550 |  | 0 | 0 | 20 | 40 | 20 |
| SAG 47 | 0.05 | 0.004 | 0.004 | 0.004 | 0.004 | 0.004 |
| MOL. SIEVES CECA NK 30 AP | 4 | 1.5 | 1.5 | 1.5 | 1.5 | 1.5 |
| AEROSIL 972 | 0.5 | 0.85 | 0.85 | 0.3 | 0.3 | 0.85 |
| SUSPENO #201 NBA |  | 0.5 | 0.5 | 0 | 0 | 0.5 |
| APP 102 |  | 15 | 30 | 0 | 0 | 15 |
| DISPERBYK 1142 |  | 0.21 | 0.21 | 0.2 | 0.2 | 0.2 |
| GRAFGUARD 160-80N |  | 10 | 20 |  |  | 10 |
| FOAMREZ SUL-4 |  | 0.08 | 0.08 | 0.08 | 0.08 | 0.08 |
| POLYCAT SA-1 CATALYST |  | 0.08 | 0.08 | 0.08 | 0.08 | 0.08 |
| DABCO 1027 CATALYST |  | 0.6 | 0.6 | 0.6 | 0.6 | 0.6 |
| FOMREZ UL-29 | 0.4 | 0 | 0 | 0 | 0 | 0 |
| TOTAL | 99.95 | 100.02 | 100.02 | 100.06 | 100.06 | 100.01 |
| #/gallon | 8.40 | 9.78 | 11.44 | 9.61 | 11.59 | 11.39 |
| Mixing Ratio by volume |  |  |  |  |  |  |
| A | 1 | 1 | 1 | 1 | 1 | 1 |
| B | 1 | 1 | 1 | 1 | 1 | 1 |
| Hardness | 75D | 77D | 77D | 70D | 70D | 76D |
| (Fire Rating) Candle test | 1 | 1 | 3 | 1 | 3 | 4 |

| | AROMATIC SPRAY ELASTOMER 50D | | | | | |
|---|---|---|---|---|---|---|
| | Example #58 | Example #59 | Example #60 | Example #61 | Example #62 | Example #63 |
| A SIDE | | | | | | |
| LUPRANATE MI, BASF | 54.3 | 49.23 | 49.23 | 49.23 | 49.23 | 49.23 |
| PROPYLENE CARBONATE | 5 | 6.3 | 6.3 | 6.3 | 6.3 | 6.3 |
| PLURACOL P1010 | 40.7 | 28 | 28 | 28 | 28 | 28 |
| 85% PHOSPHORIC ACID (10%) DILUTION | 0.025 | 0.025 | 0.025 | 0.025 | 0.025 | 0.025 |
| BYK 085 | 0.01 | 0.04 | 0.04 | 0.04 | 0.04 | 0.04 |
| BENTONE 34 | | 0.5 | 0.5 | 0.5 | 0.5 | 0.5 |
| DISPERBYK 1142 | | 0.4 | 0.4 | 0.4 | 0.4 | 0.4 |
| APP102 | | 15 | 15 | 15 | 15 | 15 |
| SUSPENO #201 NBA | | 0.5 | 0.5 | 0.5 | 0.5 | 0.5 |
| TOTAL | 100.00 | 100.00 | 100.00 | 100.00 | 100.00 | 100.00 |
| #/gallon | 9.04 | 10.77 | 10.77 | 10.77 | 10.77 | 10.77 |
| B SIDE | | | | | | |
| PEA D-2000 | 69.8 | 38.8 | 15.8 | 41.3 | 20.3 | 17.8 |
| ETHACURE 100 | 19.64 | 19 | 17 | 13 | 5 | 11 |
| Vistamine IPD | | 0.5 | 0.5 | 0.5 | 0.5 | 0.5 |
| UNILINK 4200 | 4.98 | 10 | 10 | 5 | 0 | 5 |
| RYVEC 216A BLACK PASTE ALTERNATE FOR CL-00716 | 4.48 | 3 | 3 | 3 | 3 | 3 |
| TINUVIN 292 | 0.35 | 0.3 | 0.3 | 0.3 | 0.3 | 0.3 |
| SILQUEST A-187 | 0.75 | 0.4 | 0.4 | 0.4 | 0.4 | 0.4 |
| APP 102 | | 15 | 30 | | | 15 |
| GRAFGUARD 160-80N | | 10 | 20 | | | 10 |
| FIREMASTER 520 | | | | 14 | 28 | 14 |
| EXOLIT OP-550 | | | | 20 | 40 | 20 |
| DISPERBYK 1142 | | 0.2 | 0.2 | 0.2 | 0.2 | 0.2 |
| MOL. SIEVES CECA NK 30 AP UNISIV 3A POWDER | | 1.5 | 1.5 | 1.5 | 1.5 | 1.5 |
| AEROSIL 972 (D&J) | | 0.75 | 0.75 | 0.75 | 0.75 | 0.75 |
| SUSPENO #201 NBA | | 0.5 | 0.5 | | | 0.5 |
| FOAMREZ SUL-4 | 0 | 0.025 | 0.025 | 0.025 | 0.025 | 0.025 |
| DABCO T-12 | | | | | | |
| TOTAL | 100.00 | 99.98 | 99.98 | 99.98 | 99.98 | 99.98 |
| #/gallon | 8.50 | 9.76 | 11.36 | 10.20 | 11.51 | 11.42 |
| Mixing Ratio by volume | | | | | | |
| A | 1 | 1 | 1 | 1 | 1 | 1 |
| B | 1 | 1 | 1 | 1 | 1 | 1 |
| Hardness | 50D | | | | | |
| (Fire Rating) Candle test | 1 | 1 | 3 | 1 | 3 | 4 |
| A side | | | | | | |
| DESMODUR I | 42.18 | 33.8 | 33.8 | 33.8 | 33.8 | 33.8 |
| PEA D-2000 | 45.8 | 11.96 | 11.96 | 11.96 | 11.96 | 11.96 |
| DISPERBYK 1142 | | 0.25 | 0.25 | 0.25 | 0.25 | 0.25 |
| AEROSIL 972 | | 1.99 | 1.99 | 1.99 | 1.99 | 1.99 |
| APP102 | | 11.5 | 11.5 | 11.5 | 11.5 | 11.5 |
| THIXCIN E | | 0 | 0 | 0 | 0 | 0 |
| BENTONE 34 | | 0 | 0.7 | 0 | 0.7 | 0.7 |
| BYK 085 | 0.042 | 0.03 | 0.03 | 0.03 | 0.03 | 0.03 |
| SUSPENO #201 NBA | | 0.7 | 0.7 | 0.7 | 0.7 | 0.7 |
| PROPYLENE CARBONATE | 7 | 6.97 | 6.97 | 6.97 | 6.97 | 6.97 |
| PEA D-2000 | | 29.3 | 28.6 | 29.3 | 28.6 | 28.6 |
| DESMODUR N-3300 | 5 | 3.64 | 3.64 | 3.64 | 3.64 | 3.64 |
| TOTAL | 100.00 | 100.14 | 100.14 | 100.14 | 100.14 | 100.14 |
| #/gallon | 8.80 | 9.36 | 9.39 | 9.36 | 9.39 | 9.39 |
| B side | | | | | | |
| PEA D-2000 | 45.1 | 27.5 | 5.5 | 27 | 30 | 12.5 |
| ISOPHORONE DIAMINE | 5 | 3 | 3 | 3 | 0 | 2 |
| CLEARLINK 1000 | 35.5 | 28 | 25 | 20 | 0 | 10 |
| FIREMASTER 520 | | 0 | 0 | 14 | 28 | 14 |
| EXOLIT OP-550 | | 0 | 0 | 20 | 40 | 20 |
| DISPERBYK 1142 | | 0.225 | 0.225 | 0.225 | 0.225 | 0.225 |
| MOL. SIEVES CECA NK 30 AP | 2 | 2 | 2 | 2 | 2 | 2 |
| AEROSIL 972 | 0.3 | 0.75 | 0.75 | 0.75 | 0.75 | 0.75 |
| SUSPENO #201 NBA | | 0.5 | 0.5 | | | 0.5 |
| APP 102 | | 15 | 30 | | | 15 |
| GRAFGUARD 160-80N | | 10 | 20 | | | 10 |
| DINP BASE WHITE PASTE | 10 | 10 | 10 | 10 | 10 | 10 |

-continued

| AROMATIC SPRAY ELASTOMER 50D | | | | | | |
|---|---|---|---|---|---|---|
| | Example #58 | Example #59 | Example #60 | Example #61 | Example #62 | Example #63 |
| YELLOW PASTE | | 0.82 | 0.82 | 0.82 | 0.82 | 0.82 |
| PDI BLACK 48-88030 | | 0.5 | 0.5 | 0.5 | 0.5 | 0.5 |
| BYK 085 | 0.1 | 0.1 | 0.1 | 0.1 | 0.1 | 0.1 |
| BYK 361 | 0.4 | 0 | 0 | 0 | 0 | 0 |
| TINUVIN 292 | 0.8 | 1 | 1 | 1 | 1 | 1 |
| TINUVIN 1130 | 0.8 | 0.6 | 0.6 | 0.6 | 0.6 | 0.6 |
| FOAMREZ SUL-4 | 0.01 | 0.01 | 0.01 | 0.01 | 0.01 | 0.01 |
| TOTAL | 100.00 | 100.01 | 100.01 | 100.01 | 114.01 | 100.01 |
| #/gallon | 8.99 | 10.46 | 12.33 | 10.46 | 12.06 | 12.55 |
| Mixing Ratio by volume | | | | | | |
| A | 1 | 1 | 1 | 1 | 1 | 1 |
| B | 1 | 1 | 1 | 1 | 1 | 1 |
| Hardness | 50D | 54D | 55D | 45D | 45D | 53D |
| (Fire Rating) Candle test | 1 | 1 | 3 | 1 | 3 | 4 |

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A fire retardant coating system comprising:
   a. a first part comprising at least one ingredient having NCO functionality; and
   b. a second part comprising at least one ingredient having an active hydrogen functionality that is co-reactive with the NCO;
   wherein the coating system comprises at least three fire retardant ingredients that are:
   i) a first fire retardant ingredient that is a phosphorus-based fire retardant compound,
   ii) a second fire retardant ingredient that is different from the first fire retardant ingredient and that is an intumescent material; and
   iii) a third fire retardant ingredient that is different from the first and second fire retardant ingredients and that is a brominated fire retardant ingredient; and
   wherein the first part and the second part are formulated so that when the parts are mixed together they form a cured coating having a density of greater than 40 pounds per cubic foot.

2. The fire retardant coating system of claim 1, wherein the first fire retardant ingredient is a phosphate-based compound.

3. The fire retardant coating system of claim 1, wherein the active hydrogen of the second part is provided by a hydroxy functionality.

4. The fire retardant coating system of claim 1, wherein the active hydrogen of the second part is provided by an amine functionality.

5. The fire retardant coating system of claim 1, wherein the brominated fire retardant ingredient is a brominated compound having an active hydrogen functionality that is co-reactive with the NCO of the first part.

6. The fire retardant coating system of claim 1, wherein the brominated fire retardant ingredient is a brominated compound having a functionality that is co-reactive with the active hydrogen of the second part.

7. The fire retardant coating system of claim 1, wherein the brominated fire retardant ingredient is a brominated compound that is not co-reactive with the reactants of the first or second part of the coating system.

8. The fire retardant coating system of claim 1, wherein the intumescent material is expandable graphite.

9. The fire retardant coating system of claim 1, wherein
   i) the first fire retardant ingredient is a phosphate-based compound that is APP,
   ii) the second fire retardant ingredient that is an intumescent material that is expandable graphite; and
   iii) the third fire retardant ingredient that is a brominated fire retardant ingredient having a hydroxy functionality.

10. A method of preparing a fire retardant coating comprising
    a. providing a fire retardant coating system of claim 1, and
    b. mixing the first part and the second part together so that they form a cured coating having a density of greater than 40 pounds per cubic foot.

11. A fire retardant coating made by the method of claim 10.

12. A method for protecting a surface from fire damage, comprising
    a) forming the coating of claim 11 as fire barrier on a surface to be protected.

13. A solid body cast polyurethane, polyurethane/urea or polyurea polymer system comprising fire retardant comprises:
    a. a first part comprising at least one ingredient having NCO functionality; and
    b. a second part comprising at least one ingredient having an active hydrogen functionality that is co-reactive with the NCO;
    wherein the solid body cast system comprises at least three fire retardant ingredients that are:
    i) a first fire retardant ingredient that is a phosphorus-based fire retardant compound,
    ii) a second fire retardant ingredient that is different from the first fire retardant ingredient and that is an intumescent material; and iii) a third fire retardant ingredient that is different from the first fire retardant ingredient and that is a brominated ingredient additionally having an active hydrogen functionality that is co-reactive with the NCO of the first part; and wherein the first part and the second part are formulated so that when the parts are mixed together they form a solid body having a density of greater than 40 pounds per cubic foot.

14. The solid body cast system of claim 13, wherein the first fire retardant ingredient is a phosphate-based compound.

15. The solid body cast system of claim 13, wherein the active hydrogen of the second part is provided by a hydroxy functionality.

16. The solid body cast system of claim 13, wherein the active hydrogen of the second part is provided by an amine functionality.

17. The solid body cast system of claim 13, wherein the brominated fire retardant ingredient is a brominated compound having an active hydrogen functionality that is co-reactive with the NCO of the first part.

18. The solid body cast system of claim 13, wherein the brominated fire retardant ingredient is a brominated compound having a functionality that is co-reactive with the active hydrogen of the second part.

19. The solid body cast system of claim 13, wherein the brominated fire retardant ingredient is a brominated compound that is not co-reactive with the reactants of the first or second part of the solid body cast system.

20. The solid body cast system of claim 13, wherein the intumescent material is expandable graphite.

21. The solid body cast system of claim 13, wherein
    i) the first fire retardant ingredient is a phosphate-based compound that is APP,
    ii) the second fire retardant ingredient that is an intumescent material that is expandable graphite; and
    iii) the third fire retardant ingredient that is a brominated fire retardant ingredient having a hydroxy functionality.

22. A method of preparing a solid body cast system comprising
    a. providing a fire retardant solid body cast system of claim 13, and
    b. mixing the first part and the second part together and causing them to cure in a mold so that they form a cured solid body.

23. A solid body made by the method of claim 22.

24. The fire retardant coating system of claim 1, wherein when the parts are mixed together they form a cured coating having a density of greater than 50 pounds per cubic foot.

25. The fire retardant coating system of claim 1, wherein when the parts are mixed together they form a cured coating having a density of greater than 60 pounds per cubic foot.

26. The method of claim 10, wherein the first part and the second part are mixed together so that they form a cured coating having a density of greater than 50 pounds per cubic foot.

27. The method of claim 10, wherein the first part and the second part are mixed together so that they form a cured coating having a density of greater than 60 pounds per cubic foot.

28. The fire retardant coating system of claim 1, wherein the coating formulation is substantially free of blowing agents, so that no gas cells are formed in the final coating.

29. The solid body cast polyurethane of claim 13, wherein when the parts are mixed together they form a solid body having a density of greater than 50 pounds per cubic foot.

30. The solid body cast polyurethane of claim 13, wherein when the parts are mixed together they form a solid body having a density of greater than 60 pounds per cubic foot.

* * * * *